(12) United States Patent
Benhase et al.

(10) Patent No.: US 7,376,863 B2
(45) Date of Patent: May 20, 2008

(54) APPARATUS, SYSTEM, AND METHOD FOR ERROR CHECKING AND RECOVERY OF TRANSMITTED DATA IN A SCSI ENVIRONMENT

(75) Inventors: Michael Thomas Benhase, Tucson, AZ (US); Michael John Palmer, Southampton (GB); William Garrett Verdoorn, Jr., Rochester, MN (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 10/932,774

(22) Filed: Sep. 2, 2004

(65) Prior Publication Data

US 2006/0047993 A1 Mar. 2, 2006

(51) Int. Cl.
*G06F 11/00* (2006.01)
(52) U.S. Cl. .......................... 714/6; 714/52
(58) Field of Classification Search ............ 714/6
See application file for complete search history.

(56) References Cited

U.S. PATENT DOCUMENTS

| | | | | |
|---|---|---|---|---|
| 5,640,506 | A * | 6/1997 | Duffy | 714/6 |
| 6,108,812 | A | 8/2000 | Born | 714/807 |
| 6,625,774 | B1 | 9/2003 | Yang | 714/755 |
| 7,117,422 | B2 * | 10/2006 | Duncan et al. | 714/766 |
| 2002/0138438 | A1 * | 9/2002 | Bardwell | 705/51 |
| 2002/0184556 | A1 | 12/2002 | Hashemi | 714/6 |
| 2003/0023933 | A1 * | 1/2003 | Duncan | 714/807 |
| 2003/0229844 | A1 | 12/2003 | Bansal et al. | 714/821 |
| 2003/0233611 | A1 | 12/2003 | Humlicek et al. | 714/763 |
| 2004/0017778 | A1 | 1/2004 | Bansal et al. | 370/242 |
| 2004/0095666 | A1 | 5/2004 | Asano et al. | 360/53 |

OTHER PUBLICATIONS

Sun Microsystems, Inc. Sun StorEdge 3000 Family RAID Firmware 3.25 and 3.27 User's Guide. Dot Hill Systems Corporation. Mar. 2004. Revision A. pp. 144,145.*
Elliott, Robert C. Project T10/1417-D Information Technology—SCSI Block Commands—2 (SBC-2). Mar. 20, 2004. Revision 13. pp. 5,25,26.*
Wikipedia. Redundancy check. Mar. 28, 2007. [retrieved on Jul. 12, 2007]. Retrieved from the Internet:<URL: http://en.wikipedia.org/wiki/Redundancy_check>.*
"Byte-Wide ECC/CRC Code ANS Syndrome Calculator", IBM Technical Disclosure Bulletin, vol. 29 No. 5, Oct. 1986 pp. 2141-2145 XP00715539.
"Search T10 Document Register", Internet acticle pp. 1-2, XP002380251 http://www.t10.org/cgi-bin/search.cgi?PrevURL=&PrevName=&Title=raid&Author=&New=&Old=&Proto=&Revs=Highest&Maximum=10>, unknown date.
"Use of Non-XOR/CRC Guards in Raid Applications", Technical Committee on SCSCI Storage Interfaces, Aug. 8, 2003, pp. 1-6 XP002380249.

* cited by examiner

*Primary Examiner*—Nadeem Iqbal
*Assistant Examiner*—Paul F Contino
(74) *Attorney, Agent, or Firm*—Kunzler & McKenzie

(57) ABSTRACT

An apparatus, system, and method are disclosed for data error checking and recovery in a data storage device. A redundancy check module creates a redundancy check for data on a data storage device in a SCSI End-to-End Checking Standard environment and a redundancy check storage module stores the redundancy check in a guard associated with the data.

36 Claims, 11 Drawing Sheets

1100

| | Disk 1 (Data) | Disk 2 (Data) | Disk 3 (Data) | . . . | Disk N (Parity) | |
|---|---|---|---|---|---|---|
| 1110 | 512 Data Block | 512 Data Block | 512 Data Block | . . . | XOR of Data Blocks | 1126 |
| 1112 | Guard (CRC) | Guard (CRC) | Guard (CRC) | . . . | Guard (CRC) of Parity | 1128 |
| 1114 | Application Tag | Application Tag | Application Tag | . . . | XOR of Data Guards | 1130 |
| 1116 | Reference Tag | Reference Tag | Reference Tag | . . . | Reference Tag | 1132 |
| | . . . | . . . | . . . | . . . | . . . | |
| 1118 | 512 Data Block | 512 Data Block | 512 Data Block | . . . | XOR of Data Blocks | 1134 |
| 1120 | Guard (CRC) | Guard (CRC) | Guard (CRC) | . . . | Guard (CRC) of Parity | 1136 |
| 1122 | Application Tag | Application Tag | Application Tag | . . . | XOR of Data Guards | 1138 |
| 1124 | Reference Tag | Reference Tag | Reference Tag | . . . | Reference Tag | 1140 |

Column headers: 1102, 1104, 1106, 1108

FIG. 11

| | Disk 1 (Data) | Disk 2 (Data) | Disk 3 (Data) | . . . | Disk N (Parity) | |
|---|---|---|---|---|---|---|
| 1210 | 512 Data Block | 512 Data Block | 512 Data Block | . . . | XOR of Data Blocks | 1224 |
| 1212 | Guard (CRC) | Guard (CRC) | Guard (CRC) | . . . | XOR of Guards | 1226 |
| 1214 | Application Tag | Application Tag | Application Tag | . . . | XOR of App Tags | 1228 |
| 1216 | Reference Tag | Reference Tag | Reference Tag | . . . | XOR of Reference Tags | 1230 |
| 1218 | Guard 2 (CRC) | Guard 2 (CRC) | Guard 2 (CRC) | . . . | Guard 2 (CRC) of Parity | 1232 |
| 1220 | Application Tag 2 | Application Tag 2 | Application Tag 2 | . . . | XOR of Data Guards 2s | 1234 |
| 1222 | Reference Tag 2 | Reference Tag 2 | Reference Tag 2 | . . . | Reference Tag 2 | 1236 |
| | . . . | . . . | . . . | . . . | . . . | |
| Row M 1238 | 512 Data Block | 512 Data Block | 512 Data Block | . . . | XOR of Data Blocks | |
| | Guard (CRC) | Guard (CRC) | Guard (CRC) | . . . | XOR of Guards | |
| | Application Tag | Application Tag | Application Tag | . . . | XOR of App Tags | |
| | Reference Tag | Reference Tag | Reference Tag | . . . | XOR of Reference Tags | |
| | Guard 2 (CRC) | Guard 2 (CRC) | Guard 2 (CRC) | . . . | Guard 2 (CRC) of Parity | |
| | Application Tag 2 | Application Tag 2 | Application Tag 2 | . . . | XOR of Data Guards 2s | |
| | Reference Tag 2 | Reference Tag 2 | Reference Tag 2 | . . . | Reference Tag 2 | |

| | 1502 | 1504 | 1506 | | 1508 | |
|---|---|---|---|---|---|---|
| | Disk 1 (Data) | Disk 2 (Data) | Disk 3 (Data) | . . . | Disk N (Parity) | |
| 1510 | 512 Data Block | 512 Data Block | 512 Data Block | . . . | XOR of Data Blocks | 1518 |
| 1512 | Guard (CRC) | Guard (CRC) | Guard (CRC) | . . . | XOR of Guards (CRC) | 1520 |
| 1514 | Application Tag | Application Tag | Application Tag | . . . | XOR of Application Tag | 1522 |
| 1516 | Reference Tag | Reference Tag | Reference Tag | . . . | XOR of Reference Tag | 1524 |
| | . . . | . . . | . . . | . . . | . . . | |
| Row M 1526 | 512 Data Block | 512 Data Block | 512 Data Block | . . . | XOR of Data Blocks | |
| | Guard (CRC) | Guard (CRC) | Guard (CRC) | . . . | XOR of Guards (CRC) | |
| | Application Tag | Application Tag | Application Tag | . . . | XOR of Application Tag | |
| | Reference Tag | Reference Tag | Reference Tag | . . . | XOR of Reference Tag | |

| | Disk 1 (Data) | Disk 2 (Data) | Disk 3 (Data) | . . . | Disk N (Parity) | |
|---|---|---|---|---|---|---|
| 1610 | 512 Data Block | 512 Data Block | 512 Data Block | . . . | XOR of Data Blocks | 1618 |
| 1612 | Guard (CRC) | Guard (CRC) | Guard (CRC) | . . . | Guard (CRC) of Parity | 1620 |
| 1614 | Application Tag | Application Tag | Application Tag | . . . | XOR of App Tags | 1622 |
| 1616 | Reference Tag | Reference Tag | Reference Tag | . . . | XOR of Reference Tags | 1624 |
| | . . . | . . . | . . . | . . . | . . . | |
| Row M 1626 | 512 Data Block | 512 Data Block | 512 Data Block | . . . | XOR of Data Blocks | |
| | Guard (CRC) | Guard (CRC) | Guard (CRC) | . . . | Guard (CRC) of Parity | |
| | Application Tag | Application Tag | Application Tag | . . . | XOR of App Tags | |
| | Reference Tag | Reference Tag | Reference Tag | . . . | XOR of Reference Tags | |

APPARATUS, SYSTEM, AND METHOD FOR ERROR CHECKING AND RECOVERY OF TRANSMITTED DATA IN A SCSI ENVIRONMENT

BACKGROUND OF THE INVENTION

1. Field of the Invention

This invention relates to data error checking and recovery and more particularly relates to data error checking and recovery in a data storage device in a Small Computer System Interface ("SCSI") End-to-End Checking system.

2. Description of the Related Art

For current data systems, data is typically transmitted in a SCSI environment without any redundancy checking information such as parity. Currently, individual devices have internal error checking. For example, a SCSI bus may have a parity bit added to each byte. The parity is tracked from where data is sent to the target along the bus, but once the data reaches the target device, the parity information is not retained. In recognition of this problem, a new SCSI standard is emerging called the SCSI T10 End-to-End Checking Standard which addresses the problem of errors introduced somewhere in the data stream between a source and a target that may not be detected by individual devices between the source, target, and storage device.

One element of the standard is to include information along with the data in the form of a 2-byte guard, a 2-byte application tag, and a 4-byte reference tag. This allows a redundancy check to be created and stored in the guard. The application tag is used by an application and the reference tag is a logical block address. Since the redundancy check can now be done at the source and transmitted to the target and stored on disk, it can be used to endure data consistency from end to end.

A problem is created, however, in that the standard calls for the redundancy check to be a cyclic redundancy check ("CRC") using a particular polynomial. This creates a problem for a data storage device, such as a RAID 5 configured device, in that the CRC is not transitive. (RAID is an acronym for Redundant Array of Independent (or Inexpensive) Disks.) The problem is manifest when the RAID 5 data storage device performs a redundancy check on the parity drive, which is done by performing an exclusive OR ("XOR") operation on a row of data blocks. In this case, even though the data may be valid, the value returned will not match the XOR of the guard and a parity error will be flagged. The same problem occurs if the redundancy check is created using Reed Solomon Codes. The problem exists because the redundancy check chosen for the standard is not a type that is transitive such as a Longitudinal Redundancy Check ("LRC"). A transitive redundancy check type would allow a redundancy check of the parity drive to equal an XOR of the guard.

From the foregoing discussion, it should be apparent that a need exists for an apparatus, system, and method for data error checking and recovery that overcome the redundancy check problem associated with the CRC required by the SCSI End-to-End Checking Standard when storing data. Beneficially, such an apparatus, system, and method would allow data error checking and recovery in a SCSI environment and especially an End-to-End Checking Standard environment.

SUMMARY OF THE INVENTION

The present invention has been developed in response to the present state of the art, and in particular, in response to the problems and needs in the art that have not yet been fully solved by currently available data error checking and recovery in a SCSI End-to-End Checking Standard environment. Accordingly, the present invention has been developed to provide an apparatus, system, and method for data error checking and recovery that overcome many or all of the above-discussed shortcomings in the art.

The apparatus for data error checking and recovery is provided with a logic unit containing a plurality of modules configured to functionally execute the necessary steps to check data for errors and recover lost data. The invention in the described embodiments includes a redundancy check module configured to create a redundancy check for data, where the data is sent with a guard and may be a row of data on a storage device along with a related parity stripe, and a redundancy check storage module to store the redundancy check in a guard associated with the parity stripe. In one embodiment, the data sent with a guard is sent in a SCSI environment. In another embodiment, the SCSI environment is a SCSI End-to-End Checking Standard environment.

The apparatus, in one embodiment, is configured to include, in the redundancy check module, a parity stripe redundancy check module to create a first redundancy check of the parity stripe associated with the data and a data redundancy check module to create a second redundancy check of the guards of the data and, in the redundancy check storage module, an application tag storage module to store the first redundancy check of the parity stripe in the guard associated with the parity stripe and to store the second redundancy check of the guards of the data in an application tag associated with the parity stripe. In one embodiment, the first redundancy check is a cyclic redundancy check of the parity stripe. In another embodiment, the first redundancy check is created using Reed Solomon codes for the parity stripe. In yet another embodiment, the first redundancy check is a longitudinal redundancy check of the parity stripe.

In one embodiment, the second redundancy check is a check sum of the guards associated with each block of data in the row. In a further embodiment, the second redundancy check is created using an exclusive OR operation on a cyclic redundancy check stored in the guards associated with each block of data in the row. In a further configuration, the row is the data blocks stored together in a row on multiple disks of a data storage device.

In one embodiment, the redundancy check module includes a parity stripe redundancy check module that creates a first redundancy check of the parity stripe associated with the data, and the redundancy check storage module includes a parity stripe redundancy check storage module that stores the first redundancy check of the parity stripe in the guard associated with the parity stripe. In another embodiment, the redundancy check module includes a data redundancy check module that creates a second redundancy check of the guards of the data and the redundancy check storage module includes a data redundancy check storage module for storing the second redundancy check of the guards of the data in the guard associated with the parity stripe. In a further embodiment, a parity disable module is included to disable parity checking of the data.

In one embodiment, the redundancy check module includes an LRC redundancy check module that creates a longitudinal redundancy check of a second data block comprising each data block of the row, the associated guard, an application tag associated with the data block, and a reference tag associated with the data block. The redundancy check storage module further includes an LRC redundancy check storage module that stores the longitudinal redundancy check of each second data block in a second guard associated with each second data block. In another embodiment, the LRC redundancy check module also creates a longitudinal redundancy check of a second parity data block, where the second parity data block includes the parity stripe, the guard of the parity stripe, an application tag of the parity stripe, and a reference tag of the parity stripe. The LRC redundancy check storage module also stores the longitudinal redundancy check of the second parity data block in a second guard associated with the second parity data block. In yet another embodiment, the parity stripe, the guard of the parity stripe, the application tag of the parity stripe and the reference tag of the parity stripe are created with a checksum of the data blocks, guards, application tags, and reference tags respectively of the row of data.

In addition, the data storage device further may be a RAID configured data storage device. In one embodiment, the RAID configured data storage device is a RAID 5 configured device. In an alternate embodiment, the RAID configured data storage device is a RAID 6 configured device.

In an alternate configuration, the apparatus includes a redundancy check parity stripe module that creates a first redundancy check of a parity stripe associated with data, where the data is sent with a guard and is a row of data on a storage device along with a related parity stripe, a redundancy check data module that creates a second redundancy check of the guards of the data, and a guard and application tag storage module that stores the first redundancy check of the parity stripe in a guard associated with the parity stripe and stores the second redundancy check of the guards of the data in an application tag associated with the parity stripe.

In another configuration, the apparatus includes a parity stripe check module configured to create a redundancy check of a parity stripe associated with data, wherein the data is sent with a guard and is a row of data on a storage device along with a related parity stripe, and a parity stripe check storage module configured to store the redundancy check of the parity stripe in a guard associated with the parity stripe of the data. In yet another configuration, the apparatus includes a redundancy check data module that creates a redundancy check of guards of the data, wherein the data is sent with a guard and is a row of data on a storage device along with a related parity stripe, and a data check storage module that stores the redundancy check in a guard associated with the parity stripe. One embodiment includes a disable parity module to disable parity checking of the data.

In another configuration, the apparatus includes an LRC guard module that creates a second guard LRC by performing a longitudinal redundancy check for each second data block, where each second data block comprises a data block of a row of data on a data storage device, an associated guard sent with the data block, an application tag sent with the data block, and a reference tag sent with the data block, and an LRC guard storage module that stores the second guard LRC in a second guard associated with each second data block. In an alternate embodiment, the apparatus further includes an LRC parity stripe module that creates a parity stripe by performing a checksum on each data block in the row, creates a parity guard by performing a checksum of the guards, creates a parity application tag by performing a checksum of the application tags, and creates a parity reference tag by performing a checksum of the reference tags, an LRC parity stripe check module that creates a second parity guard by performing a longitudinal redundancy check on the parity stripe, the parity guard, the parity application tag, and the parity reference tag, and an LRC parity guard storage module that stores the second parity guard in a second guard associated with the parity stripe.

A system of the present invention is also presented for data error checking and recovery. The system may be embodied by a storage server that includes a redundancy check module for creating a redundancy check for data, where the data is sent with a guard and is a row of data on a storage device along with a related parity stripe, and a redundancy check storage module for storing the redundancy check in a guard associated with the parity stripe. The system may further include a storage area network connected to the storage server, and a host server connected to the storage area network. Also included may be a computer network connected to the host server, a workstation connected to the computer network, a personal computer connected to the computer network, a printer connected to the computer network, an Internet connection to the host server, and a computer connected to the Internet.

In one embodiment, the redundancy check module includes a parity stripe redundancy check module for creating a first redundancy check of a parity stripe associated with the data and a data redundancy check module for creating a second redundancy check of the guards of the data. The redundancy check storage module includes an application tag storage module for storing the first redundancy check of the parity stripe in the guard of the parity stripe and to store the second redundancy check of the data in an application tag associated with the parity stripe. The data storage device may be a RAID 5 configured data storage device.

A method of the present invention is also presented for data error checking and recovery. The method in the disclosed embodiments substantially includes the steps necessary to carry out the functions presented above with respect to the operation of the described apparatus and system. In one embodiment, the method includes creating a redundancy check for data, where the data is sent with a guard and is a row of data on a storage device along with a related parity stripe, and storing the redundancy check in a guard associated with the parity stripe.

In a further embodiment, creating a redundancy check further includes creating a first redundancy check of the parity stripe associated with the data and creating a second redundancy check of the data, and storing the redundancy check in a guard includes storing the first redundancy check of the parity stripe in the guard associated with the parity stripe, and the method further includes storing the second redundancy check of the guards of the data in an application tag associated with the parity stripe.

In one embodiment, the first redundancy check is a cyclic redundancy check of the parity stripe. In an alternate embodiment, the first redundancy check is created using Reed Solomon codes for the parity stripe. In a further embodiment, the first redundancy check is a longitudinal redundancy check of the parity stripe. In one embodiment, the second redundancy check is a check sum of the guards associated with each block of data in the row. In another alternate embodiment, the second redundancy check is created using an exclusive OR operation on a cyclic redundancy check stored in the guards associated with each block of data in the row. In addition, the row may be the data blocks stored together in a row on multiple disks of a data storage device.

In a further alternate embodiment, creating a redundancy check includes creating a first redundancy check of the parity stripe associated with the data, and storing the redundancy check in a guard includes storing the first redundancy check of the parity stripe in the guard associated with the parity stripe. In yet another embodiment, creating a redundancy check includes creating a second redundancy check of the guards of the data, and storing the redundancy check in a guard includes storing the second redundancy check of the data in the guard associated with the parity stripe. In a further embodiment, the instructions include disabling parity checking of the data. In an alternate embodiment, the data storage device may be a RAID configured data storage device. The RAID configured storage device may be configured to be a RAID 5 device or a RAID 6 device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 11 is a schematic diagram of an alternate embodiment of an example of the data error checking and recovery from FIG. 9 in accordance with the present invention;

FIG. 12 is a schematic flow chart diagram illustrating a more detailed alternate embodiment of a method for data error checking and recovery in accordance with the present invention;

FIG. 15 is a schematic diagram of an example of the data error checking and recovery from FIG. 13 in accordance with the present invention; and FIG. 16 is a data chart illustrating an example of the method of FIG. 14 in accordance with the present invention.

DETAILED DESCRIPTION OF THE INVENTION

Figure 1:
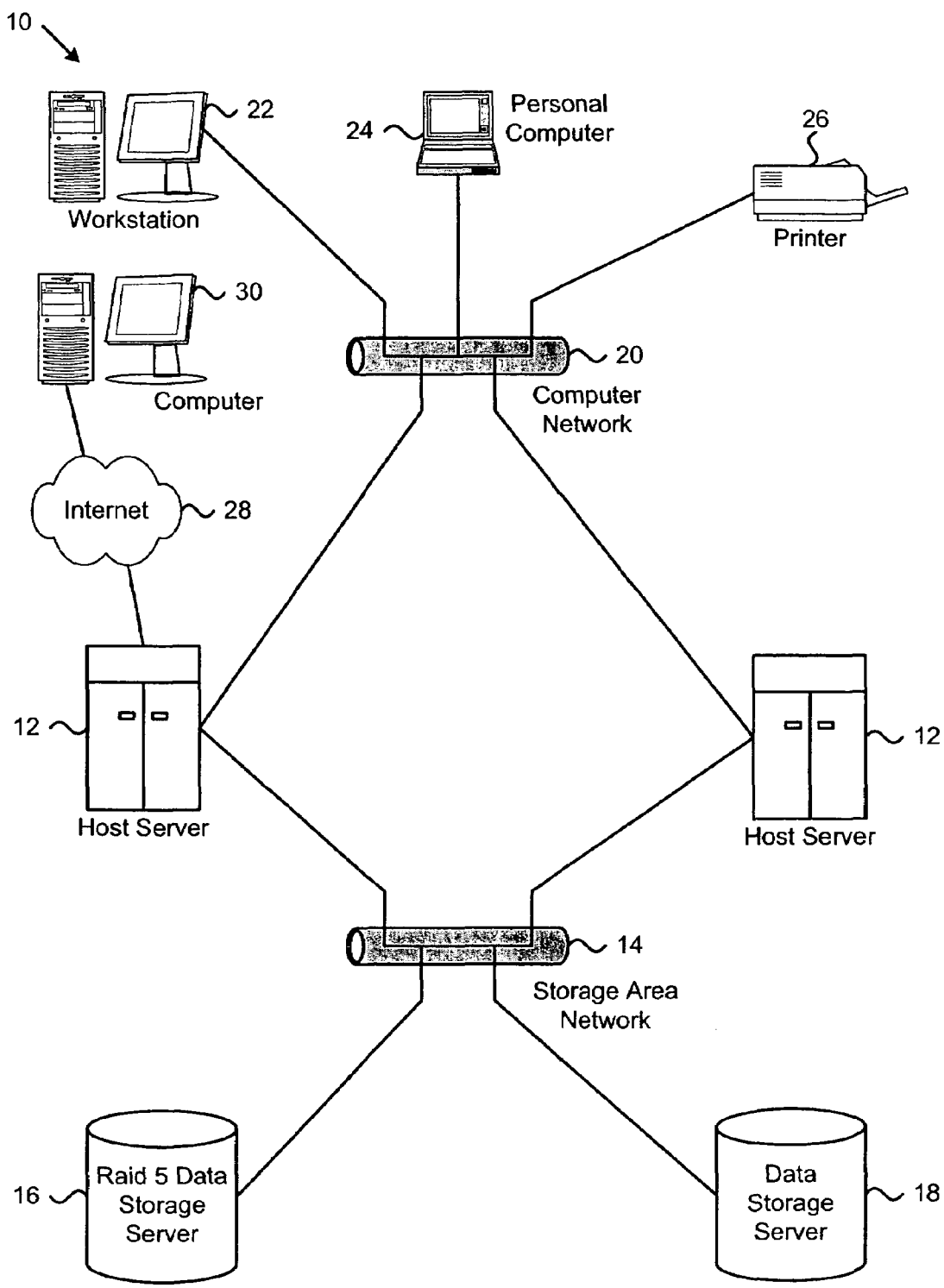
FIG. 1 is a schematic block diagram illustrating one embodiment of a system for data error checking and recovery in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different data storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts a system 10 for data error checking and recovery in a SCSI End-to-End Checking Standard environment that overcomes the problems and limitations of the prior art. The system 10 includes one or more host servers 12 connected to a storage area network 14. A RAID 5 data storage server 16 is also connected to the storage area network 14. The RAID 5 data storage server 16 may alternatively be a RAID 6 data storage server, or any other data storage device where the error checking standard causes a redundancy check problem similar to the problem described above in the Background of the Invention section. The system 10 may also include one or more other data storage servers 18.

The system 10 also may include a computer network 20. One or more workstations 22, personal computers 24, printers 26, or other devices may be connected to the computer network 20. In addition, a host server 12 may have an Internet connection 28 with other computers 30 connected to the Internet connection 28. One skilled in the art will recognize other storage area network, computer network, and Internet configurations including other data storage devices, computers, workstations, mainframe computers, personal computers, printers, and other peripherals that relevant to the present system 10.

Figure 2:
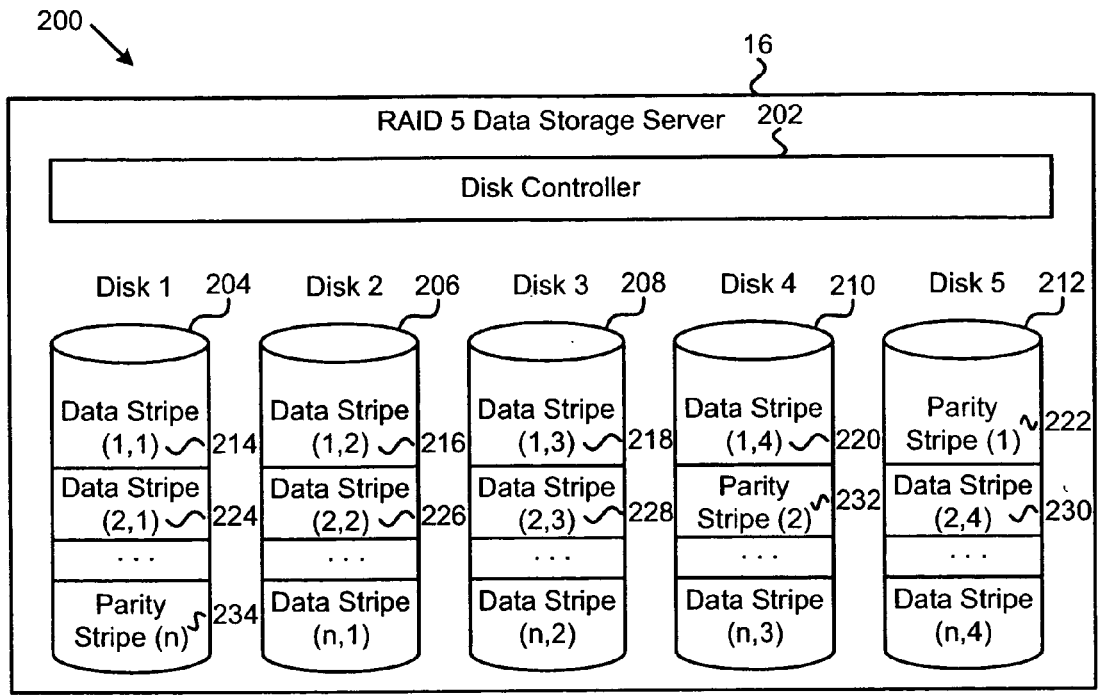
FIG. 2 is a schematic block diagram illustrating a typical RAID 5 configured data storage device in accordance with the present invention.

FIG. 2 is a more detailed block diagram 200 of the RAID 5 data storage server 16. Typically, a Raid 5 data storage server includes a disk controller 202 and an array of disks. The array of disks illustrated is a 5 disk array labeled disks 1 to disk 5 204, 206, 208, 210, 212. Other RAID 5 configurations may have a different number of disks. A RAID 5 device as described herein by way of example distributes data on the five drives by dividing it up into a convenient amount such as a 512 data block with 512 bytes of data per block. The disk controller 202 stores the first block on disk 1 204 in data stripe (1,1) 214. The next block is stored on disk 2 206 in data stripe (1,2) 216, the third data block on disk 3 208 in data stripe (1,3) 218, and the fourth data block on disk 4 210 in data stripe (1,4) 220. On disk 5, parity information is stored in a parity stripe (1) 222 for a first row of data blocks. Typically, the parity information is created by XORing each of the 512 bytes for each of the data blocks of that row. Another embodiment may include a more sophisticated redundancy check to create the parity information.

Once the first four blocks of data are stored in the first row, the disk controller 202 stores the fifth block on a second row on disk 1 204 in data stripe (2,1) 224. The sixth block is stored on the second row on disk 2 206 in data stripe (2,2) 226. The seventh data block is stored on disk 3 208 in data stripe (2,3) 228. The eighth data block, however, is stored on disk 5 212 in data stripe (2,4) 230. The parity information for the second row is stored on disk 4 210 in parity stripe (2) 232. The third row repeats this pattern storing the parity information on disk 3. This pattern continues for N rows. Here the $N^{th}$ row is depicted with the parity information for the $N^{th}$ row stored in parity stripe (n) 234 on disk 1 204, and the data for the $N^{th}$ row is stored on the other four disks.

The RAID 5 configuration allows data to be reconstructed from a failed drive using the parity information. A RAID 5 configured device is one fault tolerant so if a second drive fails or there is a media error with one drive failed, the data cannot be reconstructed.

Figure 3:
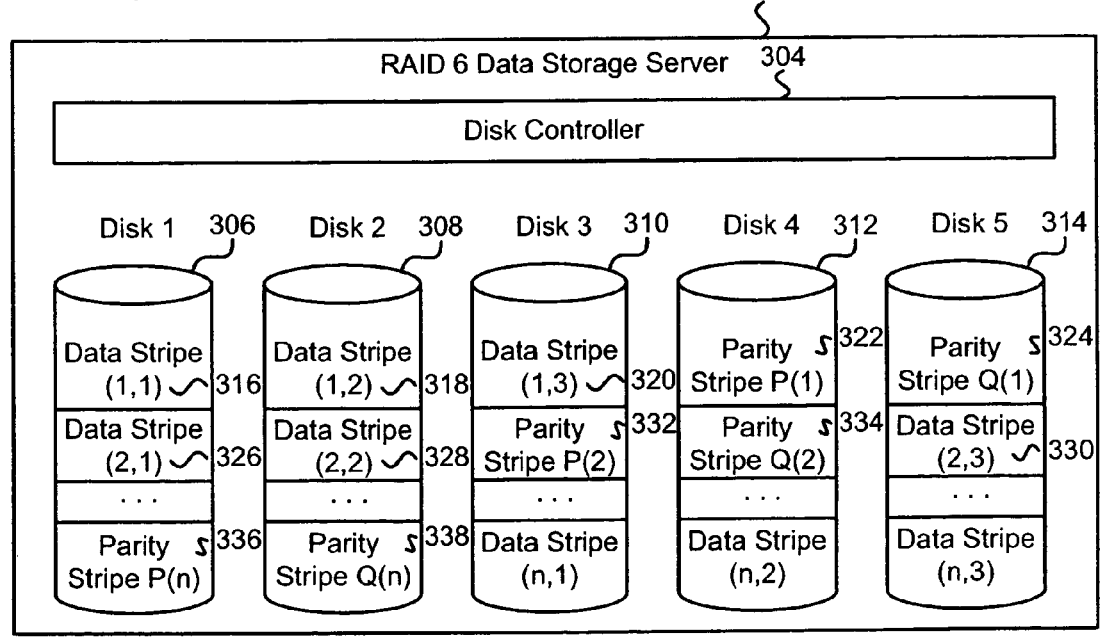
FIG. 3 is a schematic block diagram illustrating a typical RAID 6 configured data storage device in accordance with the present invention.

FIG. 3 is a block diagram 300 of a RAID 6 configured data storage server 302. Unlike a RAID 5 configured device, a RAID 6 configured data storage server 302 is two-fault tolerant because it stores two sets of parity data. The RAID 6 data storage server 302 is shown with a disk controller 304 and five disks 1-5 306, 308, 310, 312, 314. In one embodiment, when data is stored, it is first stored in the first row. Data block one is stored on disk 1 306 in data stripe (1,1) 316, data block two is stored in on disk 2 308 in data stripe (1,2) 318, and data block three is stored in on disk 3 310 in data stripe (1,3) 320. The first parity information is stored on disk 4 312 in parity stripe P(1) 322 and the second parity information is stored on disk 5 314 in parity stripe Q(1) 324. The fourth data block is then stored by the disk controller 304 on a second row on disk 1 306 in data stripe (2,1) 326, the fifth data block is stored on disk 2 308 in data stripe (2,2) 328, and the sixth data block is stored on disk 5 in data stripe (2,3) 330. The first parity information for the second row is stored on disk 3 310 in parity stripe P(2) 332 and the second parity information is stored on disk 4 312 in parity stripe Q(2) 334. This continues to the $N^{th}$ row where here it is shown that the first parity information for the row is stored on disk 1 306 in parity stripe P(n) 336 and the second parity information for the row is stored on disk 2 308 in parity stripe Q(n). The redundancy check problem with the SCSI End-to-End Checking Standard is similar to RAID 5.

Figure 4:
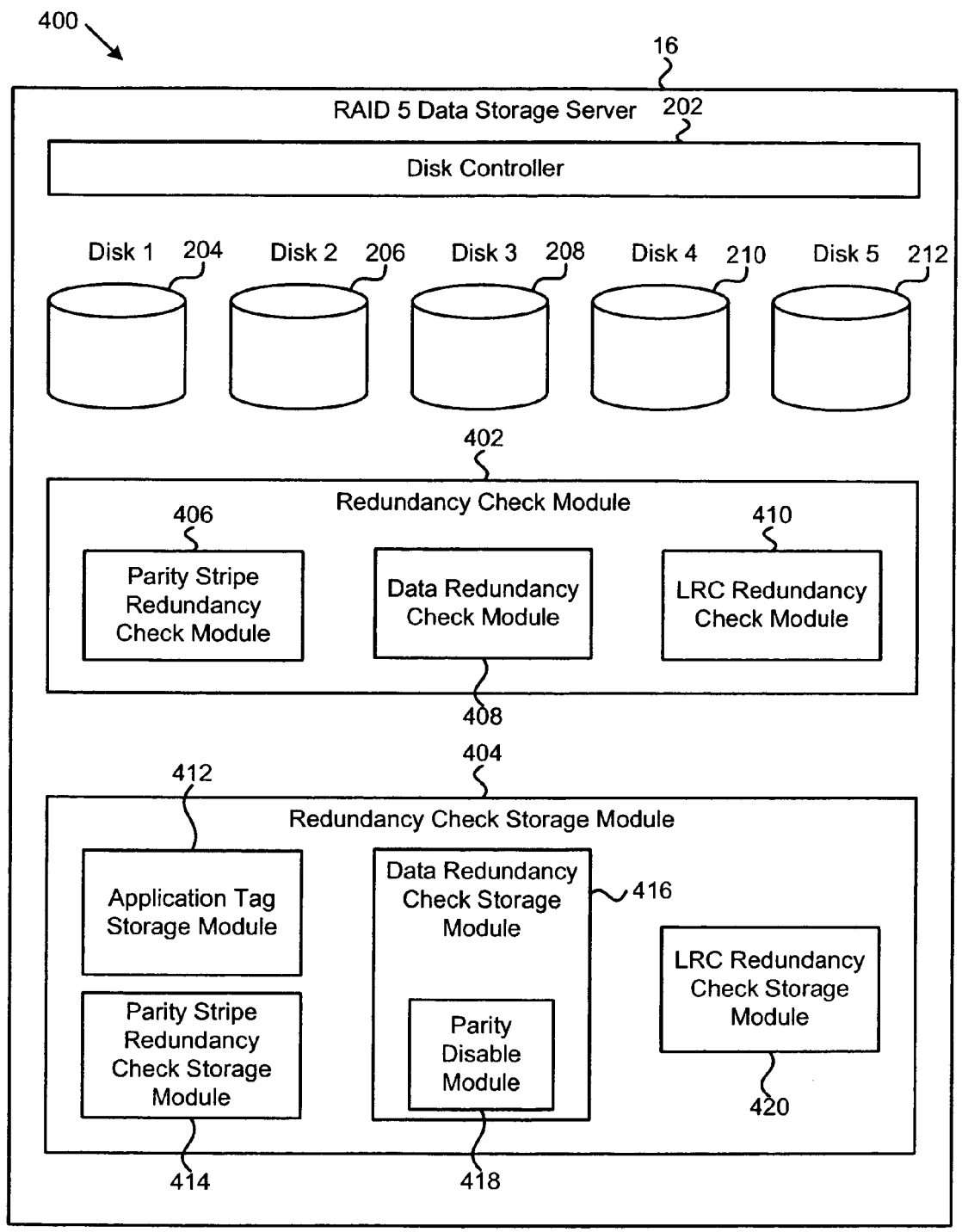
FIG. 4 is a schematic block diagram illustrating an apparatus for data error checking and recovery in accordance with the present invention.

FIG. 4 is a depiction of an apparatus 400 for data error checking and recovery and may be in a SCSI End-to-End Checking Standard environment. In this embodiment, the RAID 5 data storage server 16 is again configured with a disk controller 202 and five disks 1-5 204, 206, 208, 210, 212. In addition, the apparatus 400 includes a redundancy check module 402 configured to create a redundancy check for a row of data stored on the disks. In a SCSI End-to-End Checking Standard environment, the data may be sent with a guard. The apparatus 400 also includes a redundancy check storage module 404 configured to store the redundancy check in a guard that is associated with the parity stripe of the row of data.

In one embodiment, the redundancy check module 402 includes a parity stripe redundancy check module 406 configured to create a first redundancy check of the parity stripe associated with the data. The first redundancy check of the parity stripe may be derived by creating a CRC of the parity stripe. A data redundancy check module 408 is included and configured to create a second redundancy check of the guards of the data. In one embodiment, the second redundancy check of the guards of the data is created by XORing the guards of each block of data in a row. An LRC redundancy check module 410 creates a longitudinal redundancy check of a second data block where the second data block includes each data block of the row, the associated guard, an application tag associated with the data block, and a reference tag associated with the data block, and creates a longitudinal redundancy check of a second parity data block, where the second parity data block includes the parity stripe, the guard of the parity stripe, an application tag of the parity stripe, and a reference tag of the parity stripe.

The redundancy check storage module 404 may include an application tag storage module 412 configured to store the first redundancy check of the parity stripe in the guard of the parity stripe and to store the second redundancy check of the guards of the data in an application tag of the parity stripe. The redundancy check storage module 404 may also include a parity stripe redundancy check module 414 configured to store the first redundancy check of the parity stripe in the guard of the parity stripe. The redundancy check storage module 404 may also include a data redundancy check storage module 416 configured to store the second redundancy check of the guards of the data in the guard of the parity stripe. The data redundancy check storage module 416 may also include a parity disable module 418 configured to disable parity checking of the data. The redundancy check storage module 404 may also include an LRC redundancy check storage module 420 that stores the longitudinal redundancy check of each second data block in a second guard associated with each second data block and stores the longitudinal redundancy check of the second parity data block in a second guard associated with the second parity data block.

Figure 5:
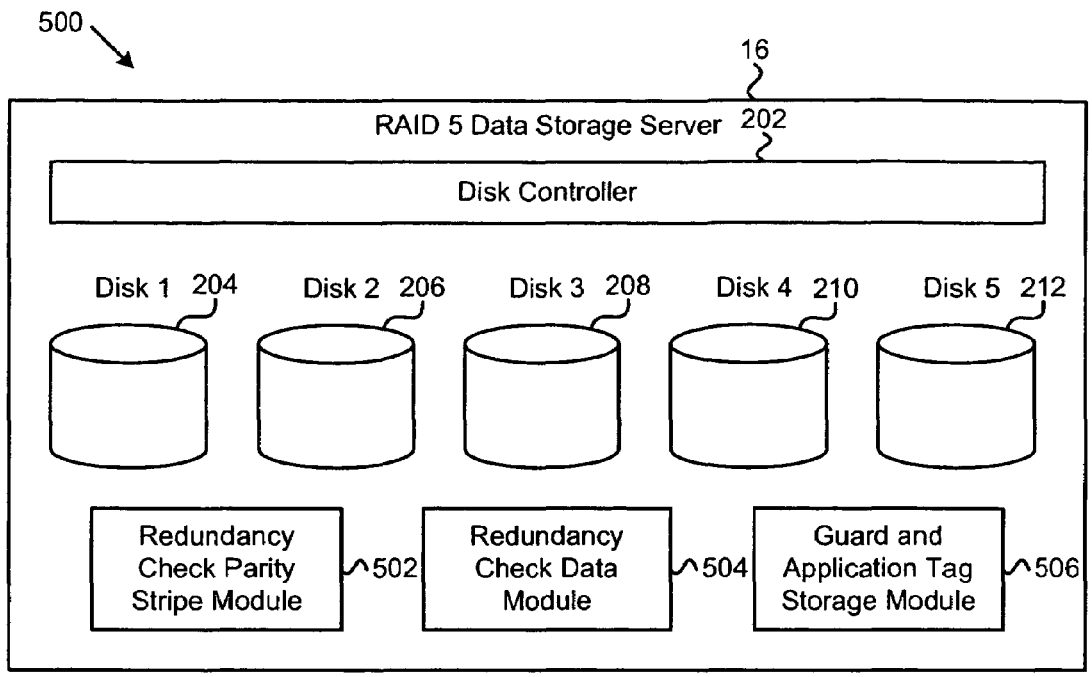
FIG. 5 is a schematic block diagram illustrating an alternate embodiment of an apparatus of for data error checking and recovery in accordance with the present invention.

FIG. 5 is a block diagram of an apparatus 500 of an alternate embodiment of the RAID 5 data storage server 16 which again includes a disk controller 202 and five disks 204, 206, 208, 210, 212. In this embodiment, the RAID 5 data storage server 16 includes a redundancy check parity stripe module 502 configured to create a first redundancy check of a parity stripe associated with data, where the data is sent with a guard and comprises a row of data on the RAID 5 data storage server 16 along with the related parity information. The data may be sent and stored in a SCSI End-to-End Checking Standard environment. The RAID 5 data storage server 16 includes a redundancy check data module 504 configured to create a second redundancy check of the guards of the data. The RAID 5 data storage server 16 also includes a guard and application tag storage module 506 configured to store the first redundancy check of the parity stripe in a guard associated with the parity stripe and to store the second redundancy check of the guards of the data in an application tag associated with the parity stripe.

Figure 6:
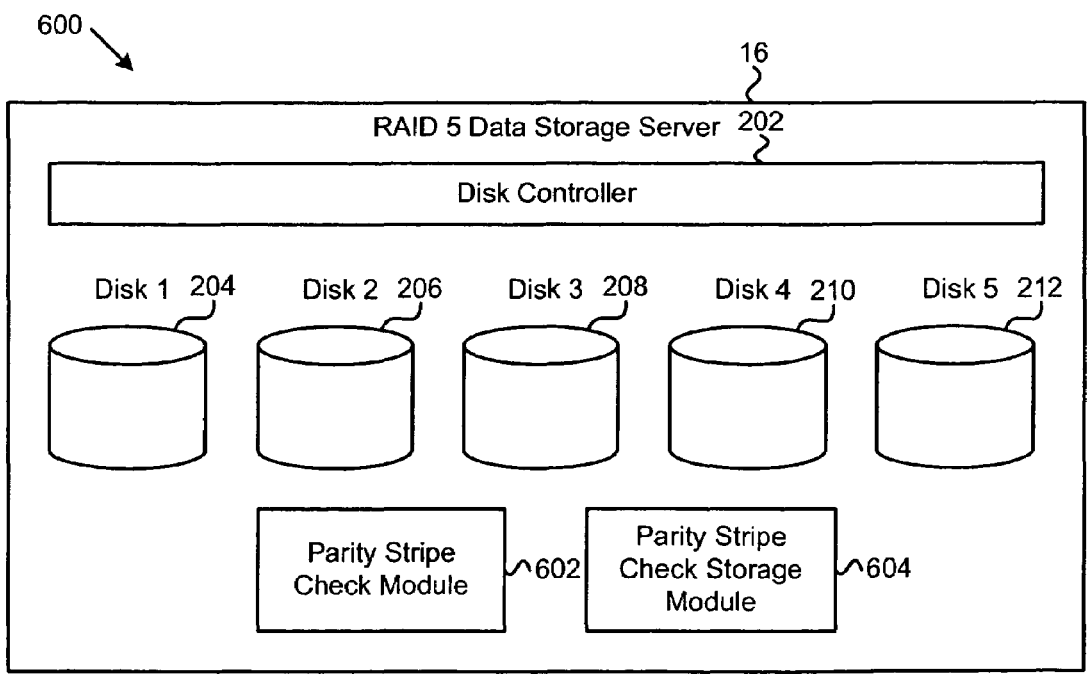
FIG. 6 is a schematic block diagram illustrating another embodiment of an apparatus of for data error checking and recovery in accordance with the present invention.

FIG. 6 is a block diagram of another embodiment of the RAID 5 data storage server 16. An apparatus 600 includes a disk controller 202 and five disks 204, 206, 208, 210, 212. In this embodiment, the RAID 5 data storage server 16 includes a parity stripe check module 602 configured to create a redundancy check of a parity stripe associated with data, where the data is sent with a guard and comprises a row of data on the RAID 5 data storage server 16 along with the related parity information. The data may be sent and stored in a SCSI End-to-End Checking-Standard environment. In addition, the RAID 5 data storage server 16 includes a parity stripe check storage module 604 configured to store the redundancy check of the parity stripe in a guard associated with the parity stripe.

Figure 7:
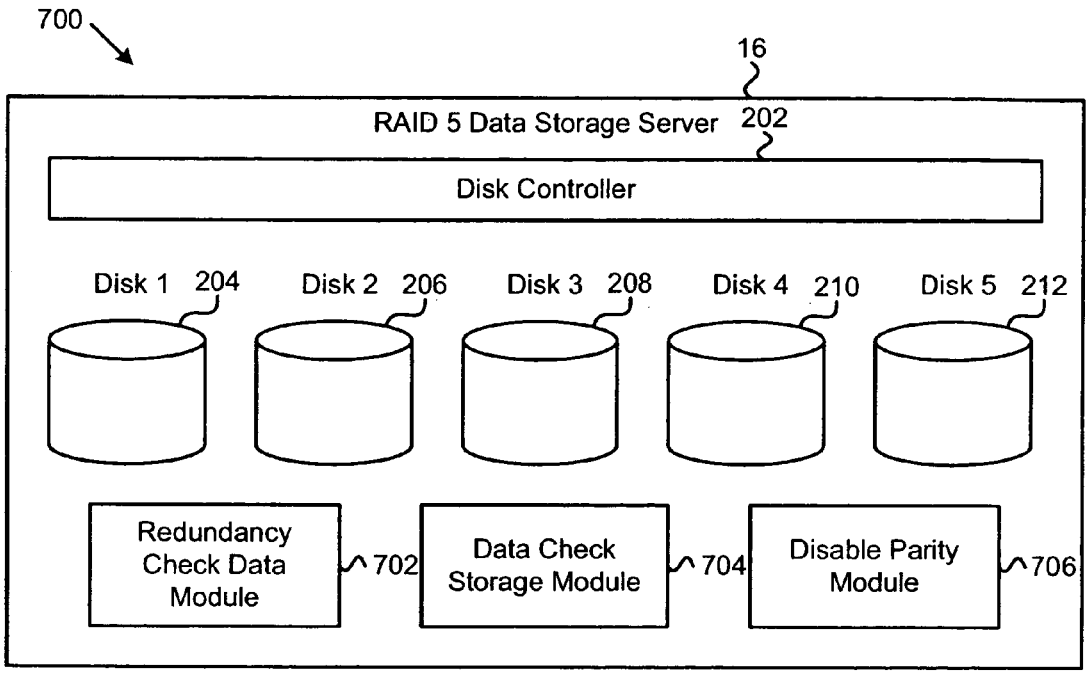
FIG. 7 is a schematic block diagram illustrating yet another embodiment of an apparatus of for data error checking and recovery in accordance with the present invention.

FIG. 7 is a block diagram of yet another embodiment of the RAID 5 data storage server 16. An apparatus 700 includes a disk controller 202 and five disks 204, 206, 208, 210, 212. In this embodiment, the RAID 5 data storage server 16 includes a redundancy check data module 702 configured to create a redundancy check of data, where the data is sent with a guard and comprises a row of data on the RAID 5 data storage server 16 along with the related parity information. The data may be sent and stored in a SCSI End-to-End Checking Standard environment. The RAID 5 data storage server 16 also includes a data check storage module 704 configured to store the redundancy check of the guards of the data in a guard associated with the parity stripe. The RAID 5 data storage server 16 may also include, in one embodiment, a disable parity module 706 configured to disable parity checking of the data.

Figure 8:
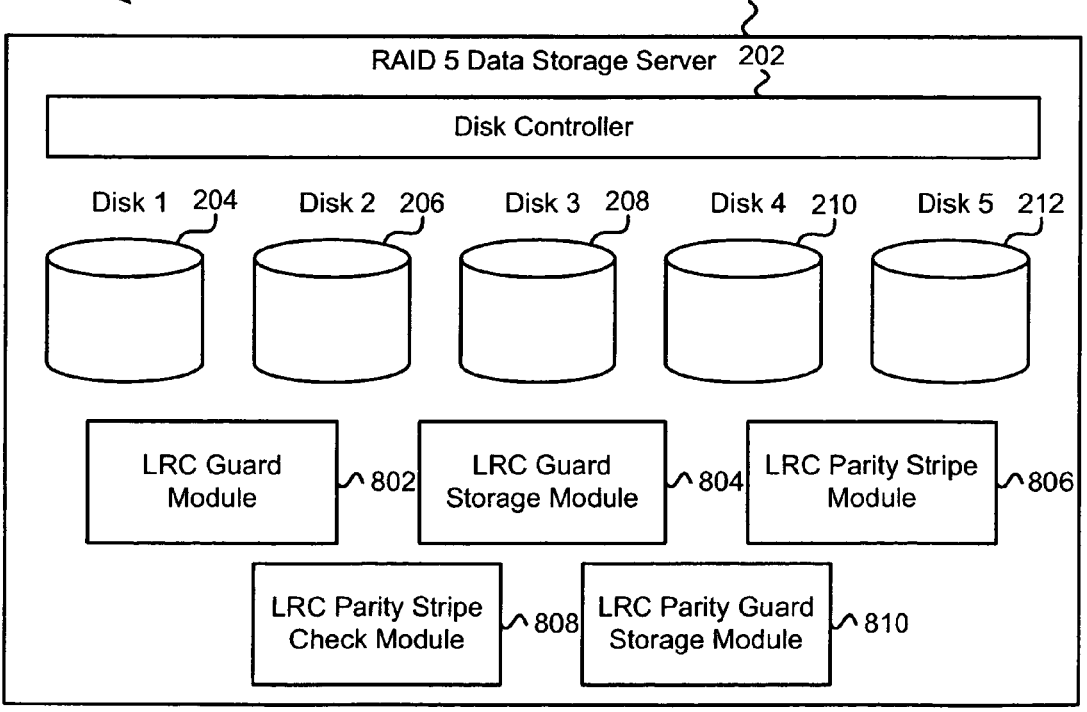
FIG. 8 is a schematic flow chart diagram illustrating one embodiment of a method for data error checking and recovery in accordance with the present invention.

FIG. 8 is a block diagram of an alternate embodiment of the RAID 5 data storage server 16. An apparatus 800 includes a disk controller 202 and five disks 204, 206, 208, 210, 212. In this embodiment, the RAID 5 data storage server 16 includes an LRC guard module 802 configured to create a second guard LRC by performing a longitudinal redundancy check for each second data block. A second data block is configured to include a data block of a row of data on a data storage device, an associated guard sent with the data block, an application tag sent with the data block, and a reference tag sent with the data block. An LRC guard storage module 804 is also included and is configured to store the second guard LRC in a second guard associated with each second data block. An LRC parity stripe module 806 is included and configure to create a parity stripe by performing a checksum on each data block in the row, to create a parity guard by performing a checksum of the guards, to create a parity application tag by performing a checksum of the application tags, and to create a parity reference tag by performing a checksum of the reference tags. An LRC parity stripe check module is included and is configured to create a second parity guard by performing a longitudinal redundancy check on the parity stripe, the parity guard, the parity application tag, and the parity reference tag, and an LRC parity guard storage module is included and configured to store the second parity guard in a second guard associated with the parity stripe.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 9:
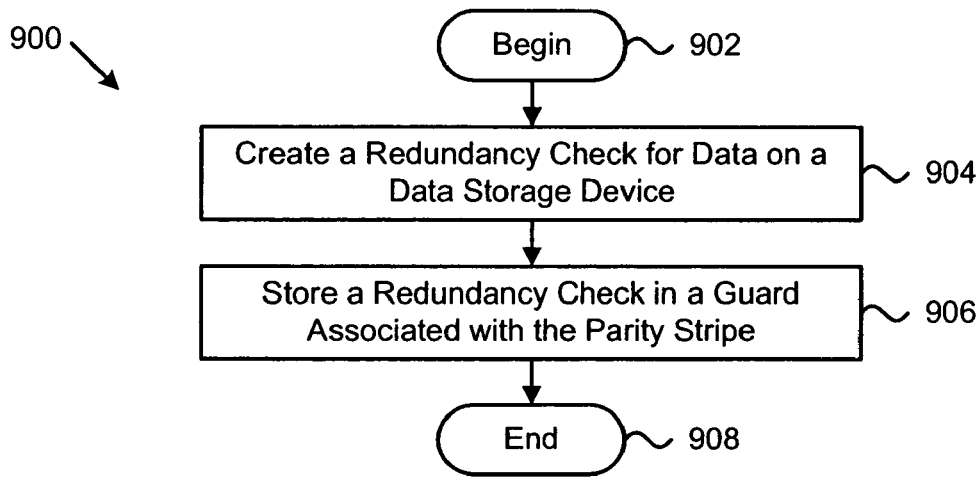
FIG. 9 is a schematic flow chart diagram illustrating a more detailed embodiment of a method for data error checking and recovery in accordance with the present invention.

FIG. 9 is a schematic flow chart of a method 900 of data error checking and recovery in a SCSI End-to-End Checking Standard environment. The method 900 begins 902 with the redundancy check module 402 creating 904 a redundancy check for data, where the data is sent with a guard and is a row of data on a storage device along with a related parity stripe. The redundancy check storage module 404 then stores 906 the redundancy check in a guard associated with the parity stripe and the method 900 ends 908.

Figure 10:
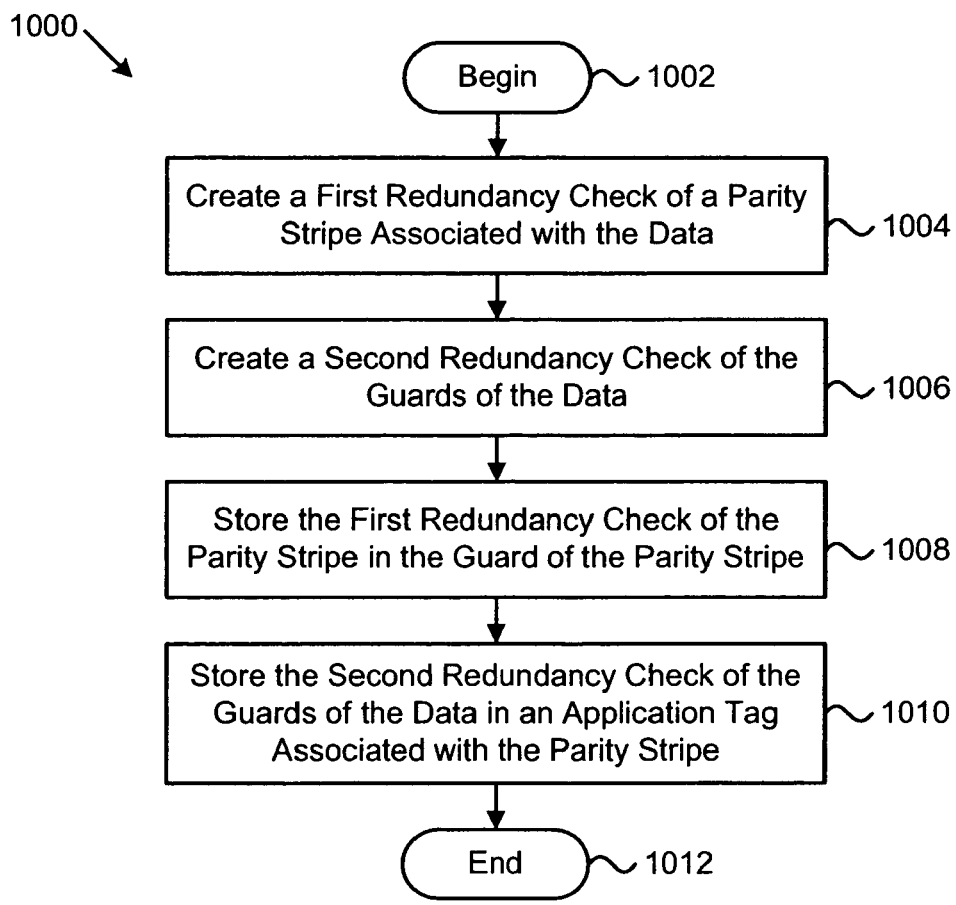
FIG. 10 is a schematic diagram of an example of the data error checking and recovery from FIG. 9 in accordance with the present invention.

FIG. 10 is a schematic flow chart of an alternate method 1000 of data error checking and recovery where the data may be sent or stored in a SCSI End-to-End Checking Standard environment. The method 1000 begins 1002 when the parity stripe redundancy check module 406 creates 1004 a first redundancy check of a parity stripe associated with the data. The data redundancy check module 408 then creates 1006 a second redundancy check of the guards of the data. The application tag storage module 412 then stores 1008 the first redundancy check of the parity stripe in the guard of the parity stripe. The application tag storage module 412 also stores 1010 the second redundancy check of the guards of the data in an application tag associated with the parity stripe and the method 1000 ends 1012. A detailed example is provided in FIG. 11 along with the benefits of method 1000.

FIG. 11 is a data chart 1100 illustrating an example of the method 1000 of FIG. 10. The chart 1100 depicts data as stored on the disks of a RAID 5 data storage server 16 which can have any number of disks. N disks are depicted in the chart 1100. The data associated with each disk is shown in columns where disk 1 data is in column 1 1102, disk 2 data is in column 2 1104, disk 3 data is in column 3 1106. This continues to disk N in column N 1108. For this example, a data block is configured to be a 512 data block 1110 with 512 bytes. In a SCSI End-to-End Checking Standard environment, each data block 1110 includes a 2-byte guard 1112, a 2-byte application tag 1114, and a 4-byte reference tag 1116. For each row of data this pattern of data is repeated. The $M^{th}$ row is shown here as a 512 data block 1118, guard 1120, application tag 1122, and reference tag 1124. For simplicity, the parity information is always shown in column N, whereas an actual RAID 5 configured storage server 16 will have the parity information distributed as shown in FIG. 2.

The guard 1112 is a CRC of the 512 data block 1110 based on a polynomial specified in the SCSI End-to-End Checking Standard. The application tag 1114 may contain application data and may either be set at a source or at a target depending upon whether or not an application tag protection bit is set that is part of a SCSI command under the SCSI End-to-End Checking Standard. If the application tag 1114 is set by the source and therefore protected, the application tag 1114 may not be overwritten by the target. In this example, the application tag may be overwritten at the target and used for redundancy check data.

In the chart 1100, column N 1108 is associated with parity information. A parity stripe, depicted here as parity block 1126, is created by XORing each of the 512 data blocks 1110 together in the row and storing the result in the parity block 1126. The guard 1128 of the parity disk in column N 1108 in this example is configured to create a CRC of the parity block 1126. In the chart 1100, since the application tag 1114 can be set by the target, the application tag 1130 of column N 1108 is created by XORing the guards 1112 of each column of data. The logical block address of the column N 1108 data is stored in the reference tag 1132. The pattern is repeated for M rows so that in this example 1100, the $M^{th}$ row of column N 1108 includes parity data 1134, a CRC of the parity data stored in the guard 1136, an XOR of the data guard CRCs stored in the application tag 1138, and a reference tag 1140.

Since the CRC data stored in each guard 1112, 1128 is specified in depicted embodiments by the SCSI End-to-End Checking Standard and is created using a polynomial that is not transitive, such as is the case with an LRC, the CRC of the parity block 1126 stored in the column N 1108 guard 1128 will be different than the value stored in the application tag 1130. Both the parity block CRC 1128 in the parity column N 1108 and the XOR of the data guards stored in the parity column N 1108 application tag 1130 are useful information. The CRC of the parity block stored in the guard 1128 is useful in detecting parity errors, but this information cannot be used alone to regenerate a guard CRC 1112 if a drive fails. With only the guard CRC of the parity 1128, the guard CRC 1112 of the failed drive must be recreated after the 512 data block 1110 of the failed drive is recreated. This is risky because the recreated CRC may be based on incorrect data.

If only an XOR of the guard CRCs 1112 is created and stored in the guard 1128 of column N 1108, but the CRC of the parity block 1126 is not created, parity checking of the target data storage device must be disabled since the guard 1128 of column N 1108 with the XOR of the guard CRCs 1112 will generate a parity error. The ability to store both the CRC of the parity block 1126 and the XOR of the data block CRCs 1112 allows both parity checking and recreation of a CRC from other CRCs of the row. This allows the newly recreated CRC to be used to check the newly recreated data to ensure the recreated data does not have an error.

FIG. 12 is data chart 1200 illustrating a further example of the method 1000 of FIG. 10. In this example, the application data bit is such that the application data cannot be overwritten by a target storage device. In an alternate embodiment, the application data may be overwritten, but the method 1000 in FIG. 10 is chosen. In the chart 1200, the RAID 5 data storage server 16 is configured to add an additional 8 bytes of data to each stored data block. As in the example of FIG. 11, there are N columns where column 1 1202 is associated with disk 1, column 2 1204 is associated with disk 2, column 3 1206 is associated with disk 3, and so forth to column N 1208 which is associated with parity information. Again, in a RAID 5 environment, for each row, the parity information shifts to a new column.

As with the previous example, each column includes a 512 data block 1210, a guard 1212 with a CRC of the 512 data block 1210, an application tag 1214, and a reference tag 1216. In this example, an additional 2-byte guard 1218, a 2-byte application tag 1220, and a 4-byte reference tag 1222 are added to the 512 data block 1210 and tags 1212, 1214, 1216. The original guard 1212, application tag 1214, and reference tag 1216 are treated as data by the RAID 5 data storage server 16. The new guard 1218 is used to store a new CRC of all of data above 1210, 1212, 1214, 1216. Since the original application tag 1214 may not be changed, the RAID 5 data storage server 16 may store information in the new application tag 1220 as well as in the new reference tag 1222.

For the parity drive in column N 1208, the parity data block 1224 is again created by XORing the 512 data blocks 1210. In the chart 1200, since all data above the new tags 1218, 1220, 1222 is treated like a 512 data block 1210, the guard 1226 of column N 1208 is also created by XORing the other original guards 1212. Similarly, the application tag 1228 and reference tag 1230 of column N 1208 are created by XORing the data in the other columns. In the chart 1200, a CRC of the parity information is created of all data above 1224, 1226, 1228 and stored in a new guard 1232. An XOR of the new guards 1218 is stored in the new application tag 1234 of column N 1208. A new reference tag 1236 of column N 1208 is also created. As with the previous example, in this example there are M rows of data and each row is similar to the row of data described above. The $M^{th}$ row is shown 1238. With this example, the benefits of storing a CRC of the parity data and an XOR of the guards of the data are realized along with the cost of using 8 additional bytes per row and creating a CRC for the data.

In an alternate embodiment of the method 900 of FIG. 9, when the new guards 1218 are created, instead of using a CRC, an LRC is used. The same is true for the guard 1232 of the parity information in column N 1208. In this case, the LRC of the parity information stored in the guard 1232 for column N 1208 will match a value that is computed by a checksum of the LRCs stored in the new guards 1218. This makes it unnecessary for the new application tag 1234 to be used to store the checksum.

Figure 13:
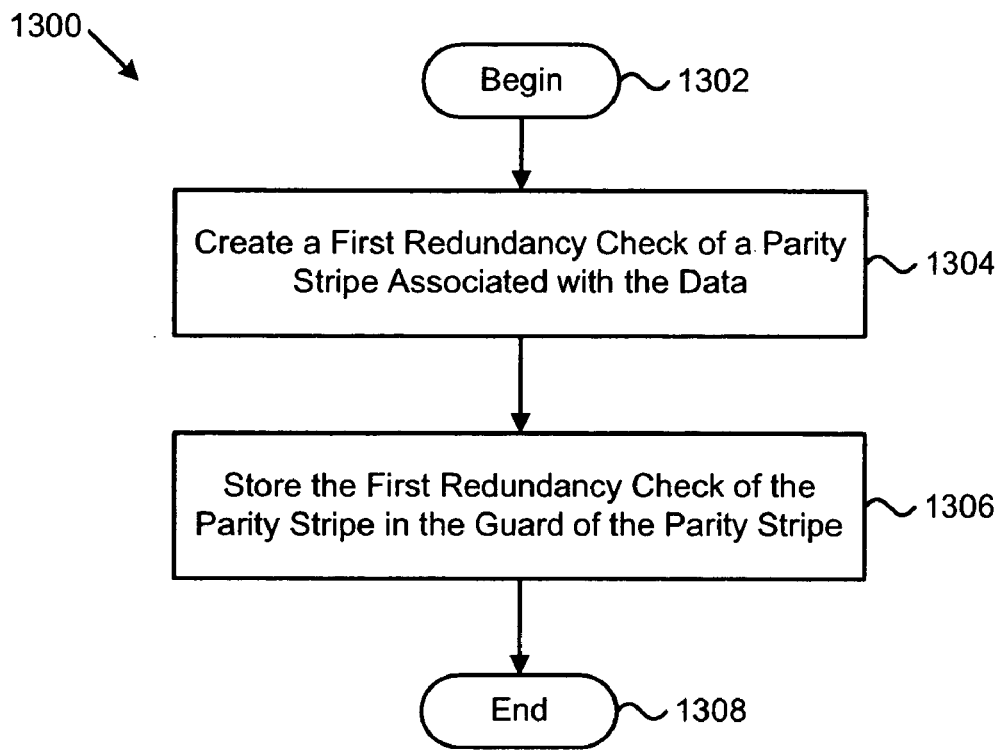
FIG. 13 is a schematic flow chart diagram illustrating another alternate embodiment of a method for data error checking and recovery in accordance with the present invention.

FIG. 13 is a flow chart diagram of another alternate embodiment of method 900 for data error checking and recovery. The method 1300 begins 1302 when the parity stripe redundancy check module 406 creates 1304 a first redundancy check of a parity stripe associated with the data. The parity stripe redundancy check storage module 414 then stores 1306 the first redundancy check of the parity stripe in the guard of the parity stripe and the method 1300 ends 1308. A more detailed example of this method 1300 is provided with relation to in FIG. 15.

Figure 14:
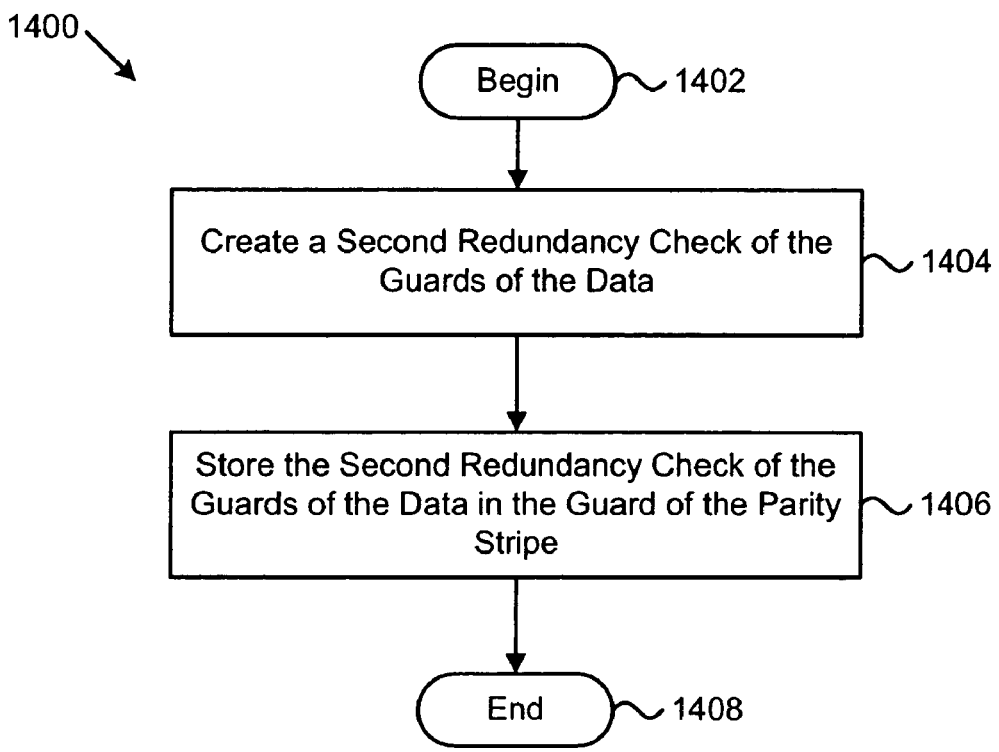
FIG. 14 is a schematic diagram of an example of the data error checking and recovery from FIG. 12 in accordance with the present invention.

FIG. 14 is a schematic flow chart of yet another alternate embodiment of method 800 for data error checking and recovery. The method 1400 begins 1402 when the data redundancy check module 408 creates 1404 a second redundancy check of the guards of the data. The data redundancy check storage module 416 then stores 1406 the second redundancy check of the data in the guard of the parity stripe and the method 1400 ends 1408. In an alternate embodiment of the method 1400, the parity disable module 418 disables parity checking on the RAID 5 data storage server 16. A more detailed example of this method 1400 is provided with relation to FIG. 16.

FIG. 15 is a data chart 1500 provided as an example of the method 1300 of FIG. 13. In this example, the application tag is not available for the RAID 5 data storage server 16 to overwrite. Additionally, extra bytes are not stored as illustrated in the example 1200 of FIG. 12. In this example, there are again N disk drives where the data of disk drive 1 is shown in column 1 1502, the data of disk drive 2 is shown in column 2 1504, the data of disk drive 3 is shown in column 3 1506, and so forth to column N 1508, where parity information is stored. In the SCSI End-to-End Checking Standard environment, a 512 data block 1510 is stored along with a CRC of the 512 data block 1510 in a guard 1512, an application tag 1514 and a reference tag 1516.

In column N 1508, a parity block 1518 is created by XORing the 512 data blocks 1510 of a row of data. In this example, the guard 1520 of column N 1508 contains an XOR of the guards 1512 of the 512 data blocks 1510. One advantage of the method 1300 of this arrangement is that if a disk drive is lost, in addition to being able to regenerate the missing data from the other 512 data blocks 1510 and the parity information 1518, the missing CRC stored in the guard 1512 of the missing drive can be recreated from the other CRCs in guards 1512 and the data in the guard 1520 on column N 1508. This arrangement ensures continuity of the data since the recreated CRC can be used to verify that the recreated data is accurate. As discussed in the example of FIG. 10, a disadvantage of method 1200 and this example is that parity checking must be disabled since the data stored in the guard 1520 of column N 1508 will cause a parity error.

Since the parity information of column N 1508 consists of data created by XORing the other data on the same row 1518, 1520, the data stored in the application tag 1522 of column N 1508 is created by XORing the other application tags 1514 of the row. Similarly, the reference tag 1524 of column N 1508 is created by XORing the other reference tags 1516 of the row. Again, the pattern repeats for M rows of data and the $M^{th}$ row is shown 1526.

FIG. 16 is a data chart 1600 illustrating an example of the method 1400 of FIG. 14. In the chart 1600, the application tag is not available for the RAID 5 data storage server 16 to overwrite. Again, extra bytes are not stored as illustrated in the example 1200 of FIG. 12. In this arrangement, there are once again N disk drives where the data of disk drive 1 is shown in column 1 1602, the data of disk drive 2 is shown in column 2 1604, the data of disk drive 3 is shown in column 3 1606, and in column N 1608 the parity information is stored. In the SCSI End-to-End Checking Standard environment, a 512 data block 1610 is stored along with a CRC of the 512 data block 1610 in a guard 1612, an application tag 1614 and a reference tag 1616.

In column N 1608, parity information 1618 is created by XORing the 512 data blocks 1610. In this arrangement, the guard 1620 of column N 1608 contains a CRC calculated from the parity information 1618. One advantage of the method 1300 of this example 1600 is that the parity information in the guard 1620 of column N 1608 is accurate so parity checking can be enabled. Another advantage of this method 1300 over the method 900 of the example 1100 shown in FIG. 11 is that extra bytes beyond what is required by the SCSI End-to-End Checking Standard are not used. As discussed previously in the example of FIG. 10, the disadvantage of this method 1300 is that if a disk drive is lost, the CRC of the regenerated data cannot be generated from the other existing CRCs stored in the guards 1612 and the information stored in the guard 1620 of column N 1608.

As in the previous example, the data stored in the application tag 1622 of column N 1608 is created by XORing the other application tags 1614 of the row. Similarly, the reference tag 1624 of column N 1608 is created by XORing the other reference tags 1616 of the row. Again, the pattern repeats for M rows of data and the $M^{th}$ row is shown 1626.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for data error checking and recovery in a data storage device, the apparatus comprising: a processor
    a redundancy check module configured to create a redundancy check for data, wherein the data is sent with a guard and comprises a row of data on a storage device along with a related parity stripe;
    an LRC redundancy check module configured to create a longitudinal redundancy check of a second data block wherein the second data block comprises each data block of the row, the associated guard, an application tag associated with the data block, and a reference tag associated with the data block, and to create a longitudinal redundancy check of a second parity data block, wherein the second parity data block comprises the parity stripe, the guard of the parity stripe, an application tag of the parity stripe, and a reference tag of the parity stripe;
a redundancy check storage module configured to store the redundancy check in a guard associated with the parity stripe; and
an LRC redundancy check storage module configured to store the longitudinal redundancy check of each second data block in a second guard associated with each second data block and to store the longitudinal redundancy check of the second parity data block in a second guard associated with the second parity data block.

2. The apparatus of claim 1, wherein the data sent with a guard is sent in a SCSI environment.

3. The apparatus of claim 2, wherein the SCSI environment is a SCSI End-to-End Checking Standard environment.

4. The apparatus of claim 1, further comprising a parity stripe redundancy check module configured to create a first redundancy check of the parity stripe associated with the data, a data redundancy check module configured to create a second redundancy check of the guards of the data, and an application tag storage module configured to store the first redundancy check of the parity stripe in the guard associated with the parity stripe and to store the second redundancy check of the guards of the data in an application tag associated with the parity stripe.

5. The apparatus of claim 4, wherein the first redundancy check is a cyclic redundancy check of the parity stripe.

6. The apparatus of claim 4, wherein the first redundancy check is created using Reed Solomon codes for the parity stripe.

7. The apparatus of claim 4, wherein the first redundancy check is a longitudinal redundancy check of the parity stripe.

8. The apparatus of claim 4, wherein the second redundancy check is a check sum of the guards associated with each block of data in the row.

9. The apparatus of claim 4, wherein the second redundancy check is created using an exclusive OR operation on a cyclic redundancy check stored in the guards associated with each block of data in the row.

10. The apparatus of claim 1, wherein the row of data comprises the data blocks stored together in a row on multiple disks of a data storage device.

11. The apparatus of claim 1, wherein the redundancy check module comprises a parity stripe redundancy check module configured to create a first redundancy check of the parity stripe associated with the data, and the redundancy check storage module comprises a parity stripe redundancy check storage module configured to store the first redundancy check of the parity stripe in the guard associated with the parity stripe.

12. The apparatus of claim 1, wherein the redundancy check module comprises a data redundancy check module configured to create a second redundancy check of the guards of the data and the redundancy check storage module comprises a data redundancy check storage module configured to store the second redundancy check of the data in the guard associated with the parity stripe.

13. The apparatus of claim 12 further comprising a parity disable module configured to disable parity checking of the data.

14. The apparatus of claim 1, wherein the parity stripe, the guard of the parity stripe, the application tag of the parity stripe and the reference tag of the parity stripe are created with a checksum of the data blocks, guards, application tags, and reference tags respectively of the row of data.

15. The apparatus of claim 1, wherein the data storage device further comprises a RAID configured data storage device.

16. The apparatus of claim 15 wherein the RAID configured data storage device comprises a RAID 5 configured device.

17. The apparatus of claim 15 wherein the RAID configured data storage device comprises a RAID 6 configured device.

18. An apparatus for data error recovery and checking in a data storage device, the apparatus comprising: a processor
a redundancy check parity stripe module configured to create a first redundancy check of a parity stripe associated with data, wherein the data is sent with a guard and is a row of data on a storage device along with a related parity stripe;
a redundancy check data module configured to create a second redundancy check of the guards of the data;
an LRC redundancy check module configured to create a longitudinal redundancy check of a second data block wherein the second data block comprises each data block of the row, the associated guard, an application tag associated with the data block, and a reference tag associated with the data block, and to create a longitudinal redundancy check of a second parity data block, wherein the second parity data block comprises the parity stripe, the guard of the parity stripe, an application tag of the parity stripe, and a reference tag of the parity stripe;
a guard and application tag storage module configured to store the first redundancy check of the parity stripe in a guard associated with the parity stripe and to store the second redundancy check of the guards of the data in an application tag associated with the parity stripe; and
an LRC redundancy check storage module configured to store the longitudinal redundancy check of each second data block in a second guard associated with each second data block and to store the longitudinal redundancy check of the second parity data block in a second guard associated with the second parity data block.

19. An apparatus for data error checking and recovery in a data storage device, the apparatus comprising: a processor
an LRC guard module configured to create a second guard LRC by performing a longitudinal redundancy check for each second data block, wherein each second data block comprises a data block of a row of data on a data storage device, an associated guard sent with the data block, an application tag sent with the data block, and a reference tag sent with the data block;
an LRC parity stripe module configured to create a parity stripe by performing a checksum on each data block in the row, to create a parity guard by performing a checksum of the guards, to create a parity application tag by performing a checksum of the application tags, and to create a parity reference tag by performing a checksum of the reference tags;
an LRC parity stripe check module configured to create a second parity guard by performing a longitudinal redundancy check on the parity stripe, the parity guard, the parity application tag, and the parity reference tag;

an LRC guard storage module configured to store the second guard LRC in a second guard associated with each second data block; and an LRC parity guard storage module configured to store the second parity guard in a second guard associated with the parity stripe.

20. A system for data error checking and recovery in a data storage device, the system comprising:
a storage server comprising:
a redundancy check module configured to create a redundancy check for data, wherein the data is sent with a guard and is a row of data on a storage device along with a related parity stripe; and
an LRC redundancy check module configured to create a longitudinal redundancy check of a second data block wherein the second data block comprises each data block of the row, the associated guard, an application tag associated with the data block, and a reference tag associated with the data block, and to create a longitudinal redundancy check of a second parity data block, wherein the second parity data block comprises the parity stripe, the guard of the parity stripe, an application tag of the parity stripe, and a reference tag of the parity stripe;
a redundancy check storage module configured to store the redundancy check in a guard associated with the parity stripe; and
an LRC redundancy check storage module configured to store the longitudinal redundancy check of each second data block in a second guard associated with each second data block and to store the longitudinal redundancy check of the second parity data block in a second guard associated with the second parity data block.

21. The system of claim 20, wherein the redundancy check module comprises a parity stripe redundancy check module configured to create a first redundancy check of the parity stripe associated with the data and a data redundancy check module configured to create a second redundancy check of the guards of the data, and the redundancy check storage module comprises an application tag storage module configured to store the first redundancy check of the parity stripe in the guard associated with the parity stripe and to store the second redundancy check of the guards of the data in an application tag associated with the parity stripe.

22. The system of claim 20, wherein the data storage device further comprises a RAID 5 configured data storage device.

23. A computer program product comprising a computer readable medium having computer usable code executable by a digital processing apparatus to perform operations for data error checking and recovery in a data storage device, the computer program product comprising:
creating a redundancy check for data on a data storage device, wherein the data is sent with a guard and is a row of data on a storage device along with a related parity stripe;
creating a longitudinal redundancy check of a second data block on the data storage device wherein the second data block comprises each data block of the row, the associated guard, an application tag associated with the data block, and a reference tag associated with the data block, and creating a longitudinal redundancy check of a second parity data block, wherein the second parity data block comprises the parity stripe, the guard of the parity stripe, an application tag of the parity stripe, and a reference tag of the parity stripe;
storing the redundancy check in a guard associated with the parity stripe; and
storing the longitudinal redundancy check of each second data block in a second guard associated with each second data block and storing the longitudinal redundancy check of the second parity data block in a second guard associated with the second parity data block.

24. The computer program product of claim 23, wherein creating a redundancy check for data on a data storage device further comprise creating a first redundancy check of the parity stripe associated with the data, creating a second redundancy check of the guards of the data, storing the first redundancy check of the parity stripe in the guard associated with the parity stripe, and storing the second redundancy check of the guards of the data in an application tag associated with the parity stripe.

25. The computer program product of claim 24, wherein the first redundancy check is a cyclic redundancy check of the parity stripe.

26. The computer program product of claim 24, wherein the first redundancy check is created using Reed Solomon codes for the parity stripe.

27. The computer program product of claim 24, wherein the first redundancy check is a longitudinal redundancy check of the parity stripe.

28. The computer program product of claim 24, wherein the second redundancy check is a check sum of the guards associated with each block of data in the row.

29. The computer program product of claim 24, wherein the second redundancy check is created using an exclusive OR operation on a cyclic redundancy check stored in the guards associated with each block of data in the row.

30. The computer program product of claim 29, wherein the row of data comprises the data blocks stored together in a row on multiple disks of a data storage device.

31. The computer program product of claim 23, wherein creating a redundancy check further comprises creating a first redundancy check of the parity stripe associated with the data and wherein storing the redundancy check in a guard further comprises storing the first redundancy check of the parity stripe in the guard associated with the parity stripe.

32. The computer program product of claim 23, wherein creating a redundancy check further comprises operations to create a second redundancy check of the guards of the data, and storing the redundancy check in a guard further comprises operations to store the second redundancy check of the guards of the data in the guard associated with the parity stripe.

33. The computer program product of claim 32, wherein the instructions further comprise operations to disable parity checking of the data.

34. The computer program product of claim 23, wherein the data storage device further comprises a RAID 5 configured data storage device.

35. A method for data error checking and recovery in a data storage device, the method comprising:
creating a redundancy check for data, wherein the data is sent with a guard and is a row of data on a storage device along with a related parity stripe;
creating a longitudinal redundancy check of a second data block on the data storage device wherein the second data block comprises each data block of the row, the associated guard, an application tag associated with the data block, and a reference tag associated with the data block, and creating a longitudinal redundancy check of a second parity data block, wherein the second parity data block comprises the parity stripe, the guard of the parity stripe, an application tag of the parity stripe, and a reference tag of the parity stripe;

storing the redundancy check in a guard associated with the parity stripe; and storing the longitudinal redundancy check of each second data block in a second guard associated with each second data block and storing the longitudinal redundancy check of the second parity data block in a second guard associated with the second parity data block.

36. An apparatus for data error checking and recovery in a data storage device, the apparatus comprising: a processor means for creating a redundancy check for data, wherein the data is sent with a guard and is a row of data on a storage device along with a related parity stripe;

means for creating a longitudinal redundancy check of a second data block on the data storage device wherein the second data block comprises each data block of the row, the associated guard, an application tag associated with the data block, and a reference tag associated with the data block, and creating a longitudinal redundancy check of a second parity data block, wherein the second parity data block comprises the parity stripe, the guard of the parity stripe, an application tag of the parity stripe, and a reference tag of the parity stripe;

means for storing the redundancy check in a guard associated with the parity stripe; and means for storing the longitudinal redundancy check of each second data block in a second guard associated with each second data block and storing the longitudinal redundancy check of the second parity data block in a second guard associated with the second parity data block.

* * * * *